US009537770B1

(12) United States Patent
Jain et al.

(10) Patent No.: US 9,537,770 B1
(45) Date of Patent: *Jan. 3, 2017

(54) PER SERVICE EGRESS LINK SELECTION

(71) Applicant: Google Inc., Mountain View, CA (US)

(72) Inventors: Ankur Jain, Mountain View, CA (US); Michael Axelrod, Mountain View, CA (US); Steven Padgett, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/839,242

(22) Filed: Aug. 28, 2015

Related U.S. Application Data

(63) Continuation of application No. 13/838,201, filed on Mar. 15, 2013, now Pat. No. 9,124,652.

(51) Int. Cl.
    H04L 29/08    (2006.01)
    H04L 12/741   (2013.01)
    H04L 29/06    (2006.01)
    H04L 12/723   (2013.01)

(52) U.S. Cl.
    CPC .............. *H04L 45/745* (2013.01); *H04L 45/50* (2013.01); *H04L 69/22* (2013.01)

(58) Field of Classification Search
    CPC ...... H04L 67/327; H04L 45/302; H04L 45/50; H04L 1/00; H04L 12/26; H04L 12/413; H04L 12/56
    USPC ...................... 370/252, 230.1, 231, 397–401, 389,370/395.31; 706/206, 236–238
    See application file for complete search history.

(56) References Cited

U.S. PATENT DOCUMENTS

| 6,292,839 | B1 * | 9/2001  | Naudus ............... H04L 12/4633 |
|           |      |         |                            709/236 |
| 7,225,270 | B2   | 5/2007  | Barr et al.                         |
| 7,821,970 | B2 * | 10/2010 | White ..................... H04L 45/02 |
|           |      |         |                            370/230.1 |
| 7,912,074 | B2   | 3/2011  | Cantwell                            |
| 8,307,422 | B2   | 11/2012 | Varadhan et al.                     |
| 8,339,959 | B1   | 12/2012 | Moisand et al.                      |
| 9,124,652 | B1 * | 9/2015  | Jain ...................... H04L 67/327 |

(Continued)

OTHER PUBLICATIONS

US Notice of Allowance in U.S. Appl. No. 13/838,201 DTD Apr. 22, 2015.
US Office Action in U.S. Appl. No. 13/838,201 DTD Oct. 21, 2014.

*Primary Examiner* — Mohamed Kamara
(74) *Attorney, Agent, or Firm* — McDermott Will & Emery LLP

(57) ABSTRACT

Exemplary embodiments provide techniques for specifying, on a per-service basis, (1) the peering router to which a particular network packet should be directed, and (2) the egress port that the packet should use when it leaves the peering router. One embodiment encapsulates an original packet inside an encapsulating packet. The encapsulating packet may specify, as a destination, a desired peering router in order to route the packet to a specific peering router and may specify an egress port identifier identifying a desired egress port on which the packet should be sent out from the peering router. At the peering router, the encapsulated packet may be decapsulated and the desired egress port may be retrieved. Thus, general network routing information may be overridden in favor of selected service-specific routes, allowing faster routes can be chosen for more important traffic or services.

20 Claims, 5 Drawing Sheets

(56) References Cited

U.S. PATENT DOCUMENTS

| | | |
|---|---|---|
| 2002/0001313 A1 | 1/2002 | Benayoun et al. |
| 2005/0117595 A1 | 6/2005 | El-Beik et al. |
| 2006/0039364 A1 | 2/2006 | Wright |
| 2006/0059370 A1 | 3/2006 | Asnis et al. |
| 2007/0160061 A1 | 7/2007 | Vasseur et al. |
| 2011/0087789 A1 | 4/2011 | Savolainen et al. |
| 2011/0128969 A1 | 6/2011 | Scholl |
| 2012/0324044 A1* | 12/2012 | Aranda Gutierrez ... H04L 45/04 709/217 |
| 2013/0287035 A1 | 10/2013 | Scholl |
| 2014/0003232 A1 | 1/2014 | Guichard et al. |

\* cited by examiner

PER SERVICE EGRESS LINK SELECTION

CROSS-REFERENCE TO RELATED PATENT APPLICATIONS

This application is a continuation application claiming priority to U.S. application Ser. No. 13/838,201, titled "Per-Service Egress Link Selection," filed on Mar. 15, 2013, and issuing as U.S. Pat. No. 9,124,652 on Sep. 1, 2015, the entirety of which is incorporated herein by reference.

BACKGROUND

Networks, particularly large networks, may make use of points of presence (PoP) in many locations around the world. These PoPs may be, for example, proprietary networks belonging to a company. Among other things, these PoPs may carry traffic between servers and clients (e.g., end-users).

Internet Service Providers (ISPs) typically announce routes to reach their customers, and possibly of customers of downstream ISPs accessible through the ISP. Some ISPs, called transit or peer ISPs, announce routes to reach, not just their own customers, but to reach other customers as well (e.g., some transit or peer ISPS announce routes to reach anyone on the Internet).

Conventionally, the primary mechanism used to route traffic is the Border Gateway Protocol (BGP), which may run on a router. BGP accepts as input the routes that ISPs announce over various peering links, and chooses a route to use based on standard BGP metrics.

SUMMARY

In many networking situations, a client may be located in a different network than a server with which the client communicates. For example, the client may be located in the client's ISP's network, while the server may be located in the PoP. Accordingly, the traffic between the server and the client may exit the PoP over peering links, which may be established in cooperation with the client's ISP. Traffic may be placed on the peering links by one or more peering routers.

Many ISPs are associated with a PoP through multiple peering links over which traffic can be sent to the ISP. Thus, when sending network traffic to a particular end destination (e.g., a user), there are a number of possible routes that the traffic might take. Accordingly, a mechanism determining which route to use for a given packet and destination may be provided. Conventionally, this mechanism is the above-noted BGP protocol.

Once a packet is routed inside the PoP using BGP, a Domain name System (DNS) mapping and a load-balancer scheme may be used to send a client's query to a specific server. This scheme may take as an input the best paths that BGP has selected, and current utilization of links and servers, and may choose a server to map to the client/request by considering metrics such as user latency or cost of serving.

In some situations, a peering link with a particular ISP may not have sufficient capacity to carry all the traffic sent from the PoP. For example, the ISP may have insufficient router resources and/or may not wish to upgrade their traffic capacity due to strategic reasons. In other situations, the ISP may charge a substantial fee to send traffic over certain peering links.

Accordingly, it would be desirable to be able to specify on which peering link traffic should leave the PoP in order to avoid ISPs that do not have sufficient capacity. Alternatively or in addition, an ISP that charges a fee may be appropriate for some traffic but not other traffic. For example, if the ISP provides a high speed link but charges a fee for traffic to pass through the ISP, it may be desirable to use the ISP as a transit ISP for important or latency-sensitive traffic, but not routine traffic.

However, the peering link is typically located outside the PoP. Therefore, conventionally the peering router to which the traffic is to be transmitted (and the route that the traffic takes once it leaves the peering router) are chosen based on routing information obtained through BGP. BGP does not discriminate based on the original sender of the traffic, or the service with which the traffic is associated, because BGP does not typically have any visibility into which service the user is requesting. As used herein, a "service" refers to functionality hosted on a computer network, for which a requestor (e.g., a client) requests that the functionality be performed by a requestee (e.g., a server). Accordingly, using conventional BGP techniques, traffic is not separated into different categories that can be assigned to different routes.

Furthermore, in BGP's "best path selection" algorithm, only a single "best" path is typically selected. Any remaining paths (which might correspond to alternative peering links) are masked and marked as unavailable.

Exemplary embodiments described herein address these and other issues related to network services. Exemplary embodiments provide techniques for specifying, on a per-service basis, (1) the peering router to which a particular network packet should be directed, and (2) the egress port or "first hop" that the packet should use when it leaves the peering router. Accordingly, fast or efficient (and potentially expensive) routes can be chosen for important traffic or services, and slower (potentially less expensive) routes may be used for other traffic or services.

One embodiment encapsulates an original packet inside an encapsulating packet, such as a Generic Routing Encapsulation (GRE) packet. The original packet may include an original sender (e.g., the server) and an original destination (e.g., the client). In the encapsulating packet, a desired peering router may be used as the destination. Accordingly, the packet can be routed to a specific peering router.

Moreover, a peering router may associate a port, which may be a logical representation of an egress point from the peering router, with the peering link. Different links accessible to the peering router may be associated with different ports. Traffic leaving the peering router through the port may be directed to the peering link associated with the port. According to an exemplary embodiment, the encapsulating packet may include an egress port identifier identifying a desired egress port on which the packet should be sent out from the peering router. At the peering router, the encapsulated packet may be decapsulated to recover the original packet, and the desired egress port may be retrieved. The peering router may send the original packet out on the desired egress port, potentially overriding a general network routing policy (such as a policy specified by BGP). Thus, general network routing information may be overridden in favor of selected service-specific routes.

According to one embodiment, a network packet having a network packet destination may be accessed. The network packet may be associated with a service. Based on the service associated with the network packet, a peering router through which the network packet is to be routed may be selected. The network packet may be encapsulated in an encapsulating packet, where the encapsulating packet specifies the selected peering router as its encapsulating packet destination.

According to another embodiment, a network packet having a network packet destination may be accessed. The network packet may be associated with a service and encapsulated in an encapsulating packet having a specified peering router as an encapsulating packet destination. Based on the service associated with the network packet, a peering router egress port which the network packet is to use when exiting the peering router may be selected.

An egress port identifier specifying the peering router egress port may be added to the encapsulating packet.

According to another embodiment, an encapsulated packet addressed to a peering router may be accessed. An egress port identifier may be retrieved from the encapsulating packet, and the encapsulating packet may be decapsulated to retrieve a network packet. The network packet may be routed from the peering router using an egress port associated with the retrieved egress port identifier.

According to another embodiment, a network packet having a network packet destination may be accessed. The network packet may be associated with a flow or user connection. Based on the flow or user connection associated with the network packet, a peering router through which the network packet is to be routed may be selected. The network packet may be encapsulated in an encapsulating packet, where the encapsulating packet specifies the selected peering router as its encapsulating packet destination.

According to another embodiment, a routing table may be stored. An advertised route in a network may be received, where the advertised route passes through an egress port of a peering router. A service associated with network traffic may be identified, and the advertised route may be analyzed based, at least in part, on the service. The routing table may be updated to associate the advertised route with an identifier for the peering router, an identifier for the egress port of the peering router, and the service.

DETAILED DESCRIPTION

Exemplary embodiments provide techniques for specifying, at an Internet Protocol (IP) packet level and on a per-service basis, (1) the peering router to which a particular network packet should be directed, and (2) the egress port or "first hop" that the packet should use when it leaves the peering router. Accordingly, fast routes can be chosen for important traffic or services, and slower (potentially less expensive) routes may be used for other traffic or services. One embodiment encapsulates an original packet inside a Generic Routing Encapsulation (GRE) packet. A desired peering router may be used as the destination of the GRE packet. Accordingly, the packet can be routed to a specific peering router. Moreover, the encapsulated packet may include an egress port identifier identifying a desired egress port on which the packet should be sent out from the peering router. At the peering router, the encapsulated packet may be decapsulated and the desired egress port may be retrieved. Thus, general network routing information may be overridden in favor of selected service-specific routes.

Therefore, better user performance can be achieved for high value services by serving these services through the best performance path (for example, a path having the shortest packet travel time such as a path having relatively high throughput). Furthermore, a lower cost for serving packets may be achieved by sending traffic through a less expensive link which BGP may not specify as an active route. Still further, route selection may be performed using custom metrics, rather than the standard metrics used by BGP.

Figure 1:
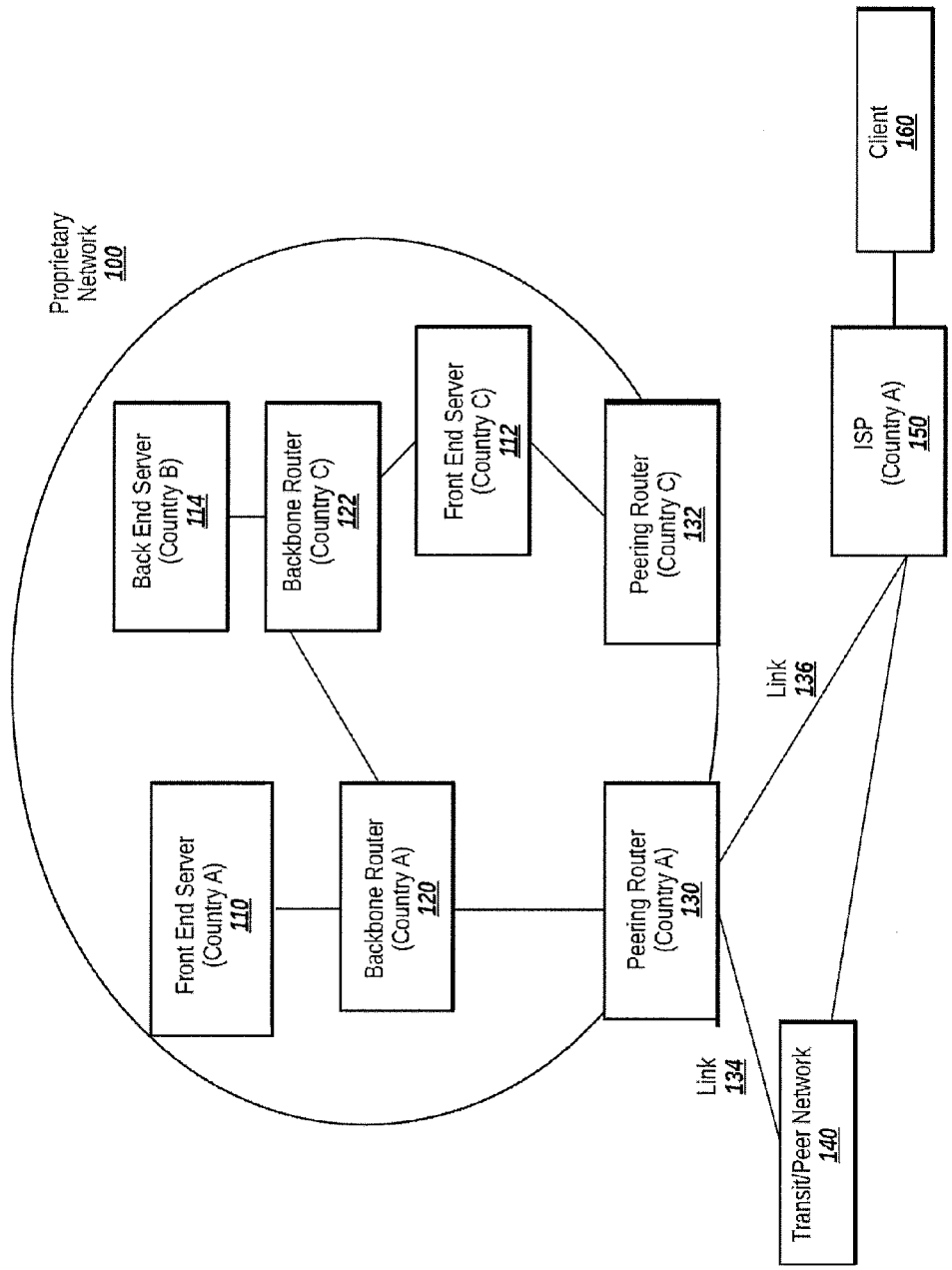
FIG. 1 depicts an exemplary network having several servers and peering routers.

FIG. 1 depicts an exemplary network including a proprietary network 100, a transit/peer network 140, and an Internet Service Provider 150 through which a client 160 may access the Internet. The network of FIG. 1 is intended to be exemplary, and one of ordinary skill in the art will recognize that the embodiments described herein are applicable to other network configurations.

Within the proprietary network 100, front end servers 110 and 112 may provide front-end services for clients, such as interfacing with clients to provide data. One or more back end servers 114 may support the front-end servers 110, 112 by performing data storage or processing duties. The front end servers 110, 112 may store cached data from the back end servers 114. When a user 160 requests data from the proprietary network 110, the front end servers 110, 112 may determine whether they are able to serve the client's request directly. If not, the front end servers 110, 112 may request that the back end server 114 addresses the request.

The front end servers 110, 112 and the back end server 114 may be connected through one or more backbone routers 120, 122 in the proprietary network. The backbone routers 120, 122 may perform routing functionality for the proprietary network 100. For example, the backbone routers 120, 122 may select routing paths through the proprietary network 100 and may perform load balancing among the front end servers 110, 112 and the back end server 114.

The proprietary network 100 may be connected to the transit/peer network 140 and/or the ISP 150 by one or more peering routers 130, 132. The peering routers 130, 132 may be receive general network routing data, such as BGP data, and may route traffic from the proprietary network 100 to the client 160 using the general network routing data.

The servers and routers of the proprietary network 100 may be provided in different locations, such as different countries. The servers and routers may be connected by one or more links, such as long-haul optical fiber links.

The peering routers 130, 132 may route the traffic to the client 160 through one or more peering links 134, 136. Each peering link 134, 136 may be associated with an egress port on a peering router connected to the peering links 134, 136. The egress port may be identified by a port identifier, such as a port number or port name. The egress port may be a logical association between a particular link 134, 136 and a network interface on the peering router. When traffic leaves the peering router on one egress port, the traffic may be placed onto a first link 134. When traffic leaves the peering router on another egress port, the traffic may be placed onto a second link 136.

As can be seen in FIG. 1, if traffic is placed on the first link 134, the traffic will be routed through the transit/peer network 140. If traffic is placed on the second link 136, the traffic will be routed to the ISP 150. Conventionally, BGP would select the link 134, 136 which the traffic uses to leave the peering router (and hence, leave the proprietary network 100) using BGP best-path metrics. The present embodiments may override the BGP-selected best path in order to specify on which link 134, 136 the traffic will leave the network.

Figure 2:
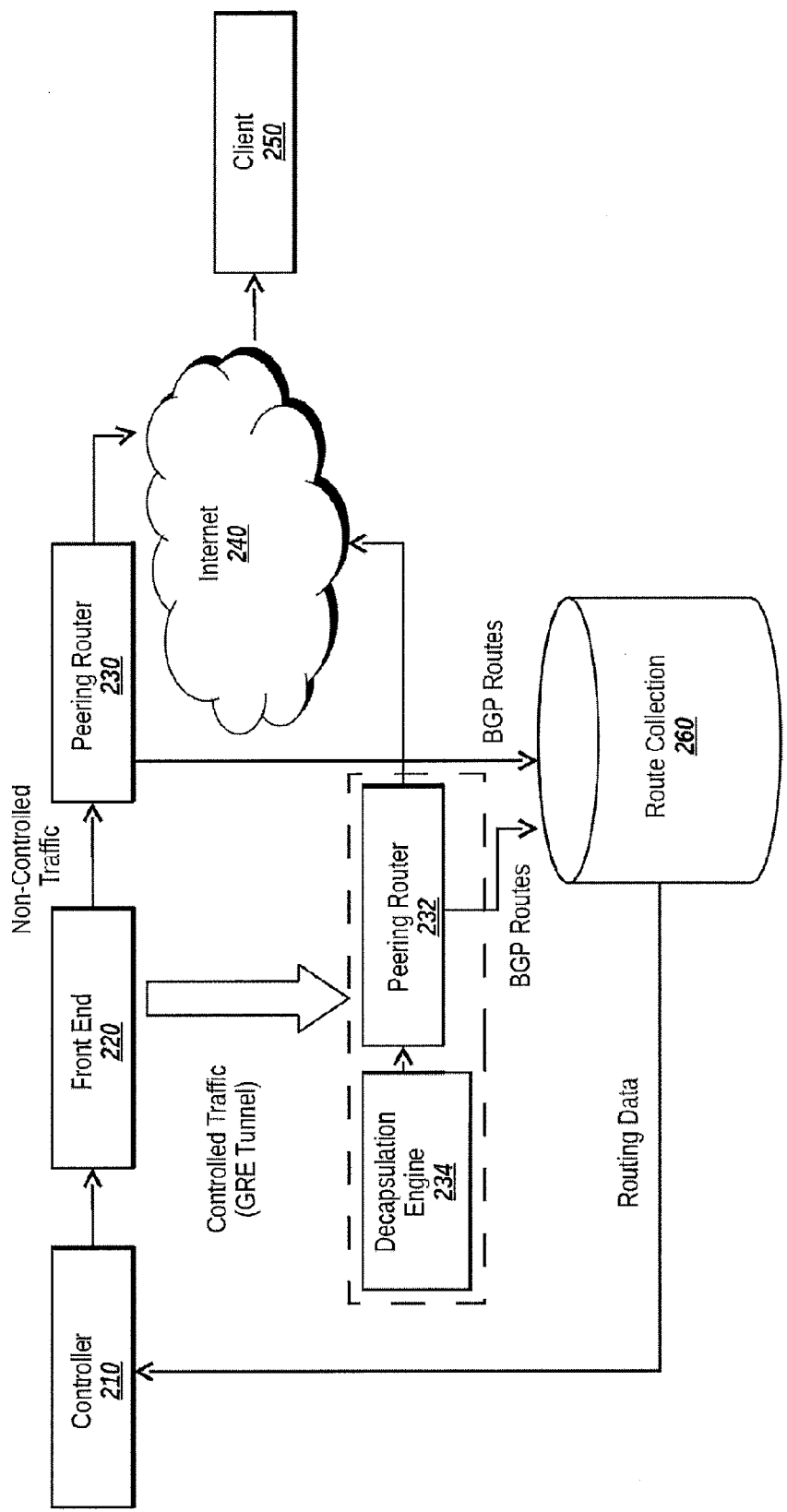
FIG. 2 depicts an overview of an exemplary routing scheme for overriding a general network routing scheme.

FIG. 2 depicts an overview of an exemplary routing scheme for overriding a general network routing scheme. Note that FIG. 2 depicts an exemplary embodiment involving a front end server. However, it is understood that exemplary embodiments need not be deployed solely on a front end server, and may also be used with other devices in the network.

A controller 210 may provide routing information to a front end server 220. The routing information may include one or more preferred routes to be used with a specified service (e.g., maps service, web search services, etc.). The routing information may specify, for example, a particular peering router and an egress port on the peering router to be used in conjunction with a specified service.

As the front end server receives requests from a client 250, a number of the requests may not relate to the service identified by the controller 210. Accordingly, this non-controlled traffic may be routed to a peering router 230 in accordance with the general network routing rules, such as BGP rules or other general routing rules that are defined for traffic inside the proprietary network.

If the front end server 220 receives a request from the client 250 relating to the service specified by the controller 210, the front end server 220 may route a response to the request to the identified peering router and egress port using the techniques described herein.

For example, assume that the controller 210 informs the front end server 220 that traffic related to a specified service should be provided to peering router 232 and should exit the peering router on a particular egress port. Upon receiving a request from the client 250 relating to the specified service, the front end 220 may generate an original packet in response. In order to ensure that the original packet is received at the peering router 232, the front end server may generate a tunnel, such as a Generic Routing Encapsulation (GRE) tunnel to the peering router 232. The front end server may encapsulate the original packet in an encapsulating packet that is compatible with the tunnel (e.g., a GRE packet). The encapsulating packet may further include a field for specifying which egress port the peering router should use for the original packet. Using the tunnel, the front end server 220 may send the encapsulating packet to the peering router 232.

It should be noted that the packet may be "tagged" to indicate that the packet should be sent to the peering router in a number of ways. Although several embodiments described herein use the GRE protocol to tag the packet (for exemplary purposes), it is understood that there are multiple ways to tag a packet and that the embodiments described herein are not limited to GRE. For example, the packet may be tagged as bound for a particular peering router using a Multiprotocol Label Switching (MPLS) label, a Virtual Local Area Network Identifier (VLAN-ID), a Generic Routing Encapsulation (GRE) tag, or an IP-IP tag included in the encapsulating packet.

Similarly, the egress port identifier may be identified in a tag, which may be represented as a Multiprotocol Label Switching (MPLS) label, a Virtual Local Area Network Identifier (VLAN-ID), a Generic Routing Encapsulation (GRE) tag, or an IP-IP tag included in the encapsulating packet. Other suitable techniques for tagging a packet may also be utilized.

The peering router may be associated with a decapsulation engine 234 which identifies encapsulated packets received by the peering router 232 and separates the encapsulated packets for specialized treatment. The decapsulation engine 234 may be the same device as the peering router 232, or may be a different device interfaced with the peering router 232. In the latter case, the decapsulation engine 234 may intercept traffic bound for the peering router 232, or alternatively the front-end server 220 may send encapsulated traffic bound for the peering router 232 directly to the decapsulation engine 234.

The decapsulation engine 234 may identify the peering router egress port identified in the encapsulating packet, and may decapsulate the encapsulating packet to retrieve the original packet. The decapsulation engine 234 may forward the original packet to the peering router (if necessary) and may further instruct the peering router to transmit the original packet on the specified egress port.

Using the specified egress port, the peering router 232 may send the original packet on the link originally specified by the controller 210, from which the original packet may traverse through the Internet 240 to reach the user 250.

The routing data used by the controller 210 may be provided by a route collection 260. The route collection 260 may receive advertised routes (e.g., advertised BGP routes) from one or more of the peering routers 230, 232. The controller 210 may consider the advertised routes, and may further accept as an input (or may calculate) the capacities of links along the advertised route, link liveliness, link utilization, end-user performance, costs of the route and costs of alternative routes, a priority of a service to be provided on the route, etc.

Based on these considerations, the controller 210 may update a routing table to associate the route with a service. The routing table may store, for example, an identifier identifying the service, and identifiers identifying the peering router and/or the peering router egress port which will allow traffic related to the service to be sent along the identified route.

Figure 3:
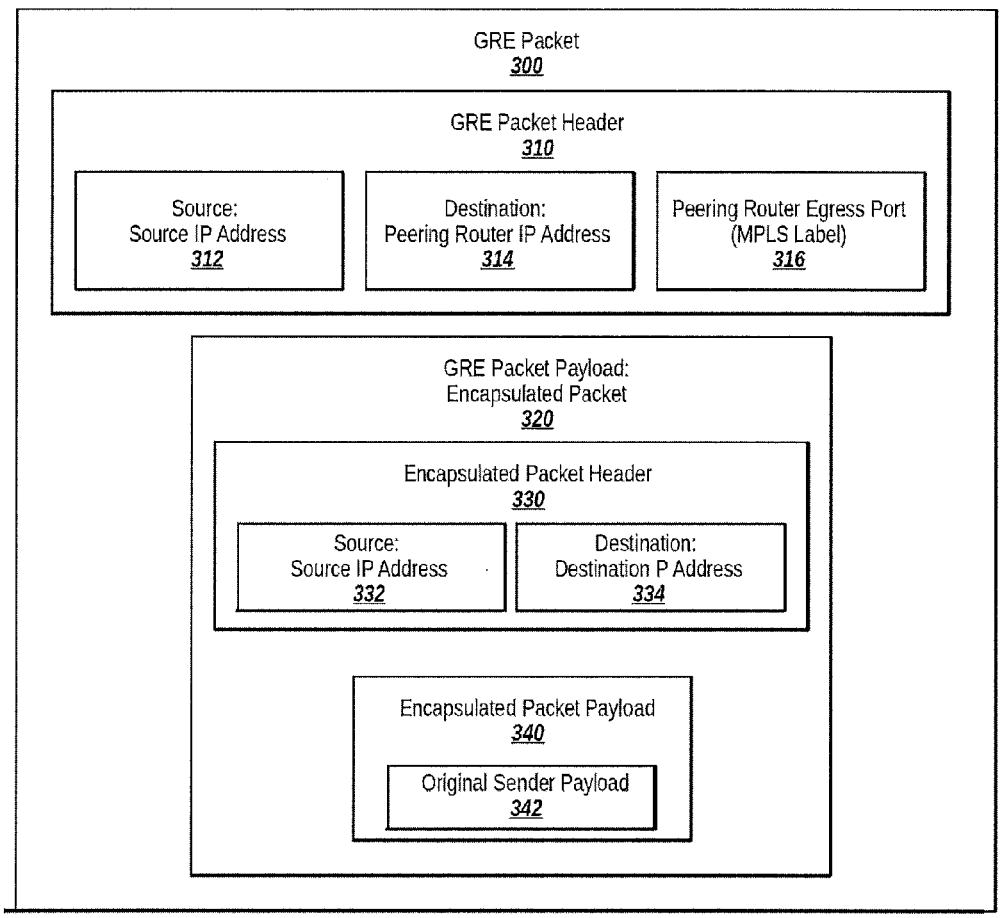
FIG. 3 depicts a format for an exemplary packet for overriding a general network routing scheme.

FIG. 3 depicts an exemplary packet format for an encapsulating packet 300 suitable for use with exemplary embodiments. Although the example of FIG. 3 is directed to an embodiment employing a GRE packet, exemplary embodiments may be equally applicable to other encapsulation and/or tunneling protocols.

The encapsulating GRE packet 300 includes a GRE packet header 310 and a GRE packet payload 320. The GRE packet header 310 may include administrative details used to route the packet to its destination. In the GRE packet header 310, a source field 312 identifies the source of the encapsulating packet. For example, the source may be the server that generated the original data and/or the encapsulating packet.

The GRE packet header 310 further includes a destination field 314 specifying the destination for the encapsulating GRE packet 300. As noted above, the destination 314 of the encapsulating GRE packet does not correspond to the final destination of the server's response data (e.g., the client), but rather corresponds to the peering router through which the response is to be routed.

Furthermore, a Peering Router Egress Port field 316 may be provided for specifying an identifier for the egress port of the peering router through which the server's response should be sent. The identifier may be an alphanumeric identifier identifying a particular egress port. For example, the identifier may be in the form of a Multiprotocol Label Switched (MPLS) label. Alternatively, the identifier may be in the form of a Virtual Local Area Network (VLAN) identifier.

The payload of the encapsulating GRE packet may include the original response generated by the server. The original response is referred to in this context as the encapsulated packet 320. The encapsulated packet 320 may have a header 330 specifying a source 332 (e.g., the server that originated the response) and a destination 334 (e.g., the client that originally requested the response). Furthermore, the encapsulated packet may have an encapsulated packet payload 340, which may include the original response 342 from the server.

When the encapsulating packet 300 is received by the peer router, the peer router may decapsulate the encapsulating packet 300 in order to retrieve the original encapsulated packet 320. Using the egress port specified in the egress port field 316, the peering router may transmit the encapsulated packet 320 to its original destination as specified in the destination field 334.

Figure 4B:
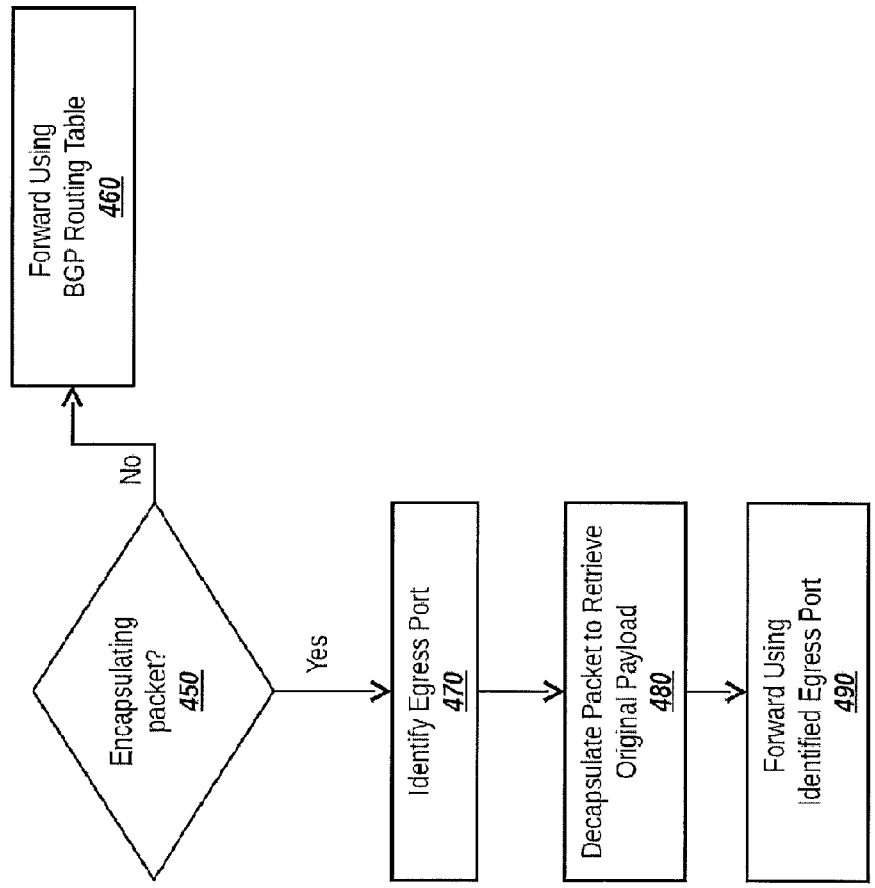
FIG. 4B depicts an exemplary process performed by a peering router.
Figure 4A:
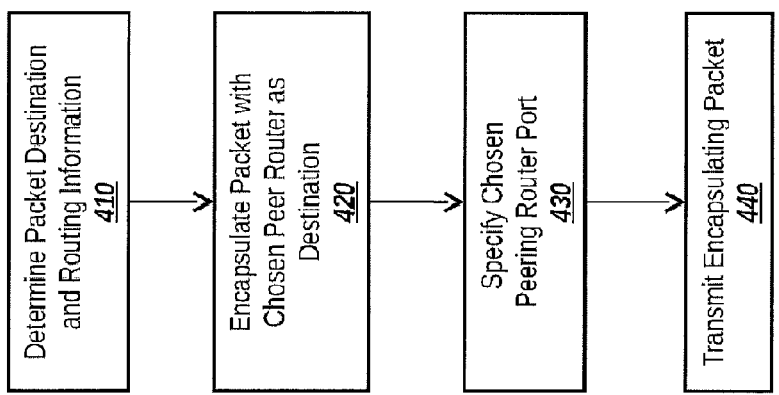
FIG. 4A depicts an exemplary process performed by a front-end server or a back-end server.

FIG. 4A depicts an exemplary procedure performed by a server to generate and send an encapsulating packet.

At step 410, the server may generate a response to a request, and may determine the destination of the response (generally the client that generated the request). The server may furthermore identify a service associated with the response, and may check a routing table or a routing controller to determine whether a specified route is associated with the service. If the service is not associated with a specified route, the server may transmit the response in the normal fashion using general network routing procedures.

If the service is associated with a specified route, then at step 420 the server may encapsulate the response in an encapsulating packet, specifying the chosen peer router as the destination of the encapsulating packet. For example, using a Linux OS kernel, the setsockopt command may be used to encapsulate a packet in a GRE encapsulating packet.

Step 420 may optionally involve creating a tunnel associated with the encapsulation protocol used to encapsulate the response. The end-point of the tunnel may be the chosen peer router.

At step 430, the server may optionally add a chosen peering router egress port identifier to the encapsulating packet. The peering router egress port identifier may be, for example, an MPLS label or a VLAN ID in a predetermined location in the encapsulating packet, such as the encapsulating packet header. For example, using a Linux OS kernel, the setsockopt command may be used to add the egress port identifier to the encapsulating packet.

At step 440, the server may transmit the encapsulating packet to the identified peering router.

FIG. 4B depicts an exemplary procedure performed by a peering router and/or a decapsulation engine to identify and handle encapsulating packets.

At step 450, the peering router and/or decapsulation engine may receive a packet and determine whether the packet is an encapsulating packet. For example, if the encapsulation protocol is associated with a tunnel, the router/engine may determine that the packet is an encapsulating packet if the packet was received over the tunnel connection. Alternatively, the router/engine may examine the packet to determine if the packet is formatted or identified as being associated with a particular encapsulation scheme.

If the answer at step 450 is "no" (i.e., the packet is not an encapsulating packet), then at step 460 the router/engine may route the packet using the general network routing procedures (e.g., using the routes defined by BGP).

If the answer at step 450 is "yes" (i.e., the packet is an encapsulating packet), then at step 470 the router/engine may examine the encapsulating packet to determine whether the encapsulating packet specifies an egress port which should be used to transmit the packet. For example, the router/engine may look at the predetermined location in the encapsulating packet to determine if an MPLS label or VLAN ID specifying an egress port is present.

At step 480, the router/engine may decapsulate the packet according to the decapsulation protocol in order to retrieve the original payload from the encapsulated packet. At step 490, the original payload may be forwarded towards the payload's final destination. If an egress port was identified at step 470, then the peering router may bypass the general network routing procedures (e.g., ignoring the egress port that BGP specified as the "best route") and may instead forward the packet on the identified egress port.

Figure 5:
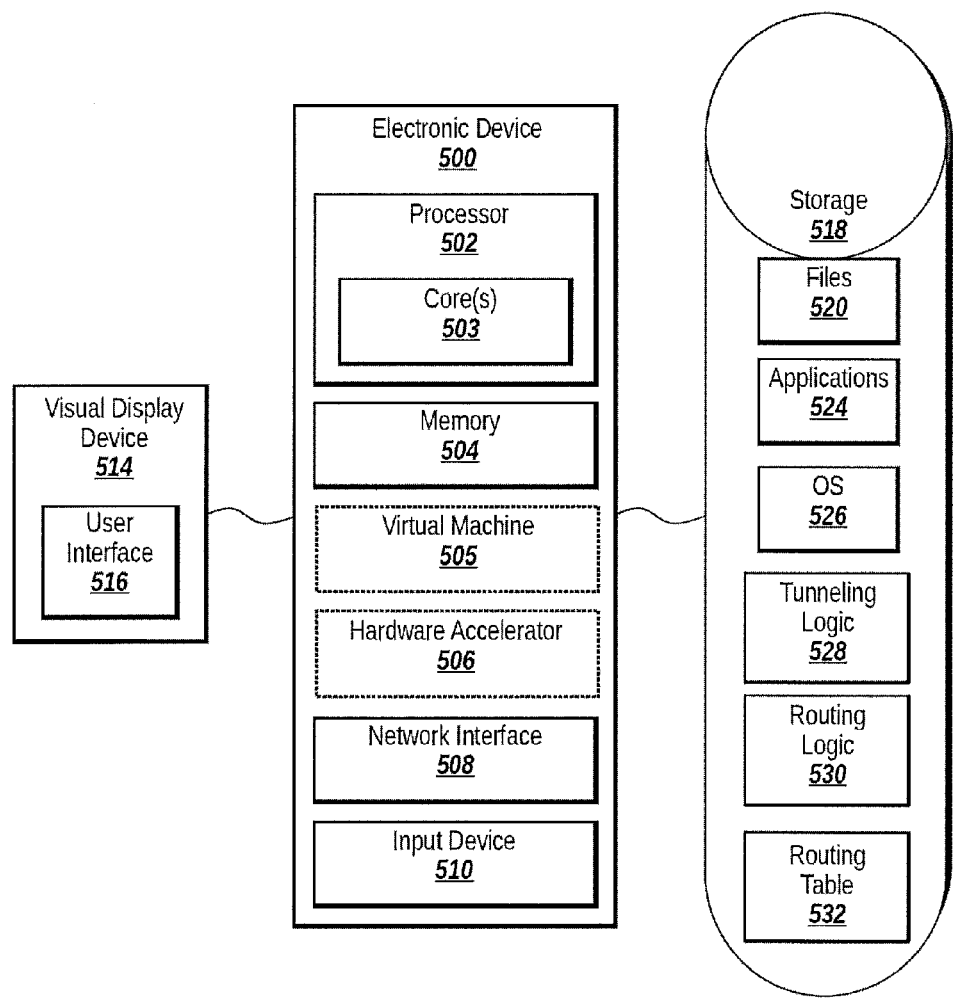
FIG. 5 depicts an exemplary computing device.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 5 depicts an example of an electronic device 500 that may be suitable for use with one or more acts disclosed herein.

The electronic device 500 may take many forms, including but not limited to a computer, workstation, server, network computer, quantum computer, optical computer, Internet appliance, mobile device, a pager, a tablet computer, a smart sensor, application specific processing device, etc.

The electronic device 500 is illustrative and may take other forms. For example, an alternative implementation of the electronic device 500 may have fewer components, more components, or components that are in a configuration that differs from the configuration of FIG. 5. The components of FIG. 5 and/or other figures described herein may be implemented using hardware based logic, software based logic and/or logic that is a combination of hardware and software based logic (e.g., hybrid logic); therefore, components illustrated in FIG. 5 and/or other figures are not limited to a specific type of logic.

The processor 502 may include hardware based logic or a combination of hardware based logic and software to execute instructions on behalf of the electronic device 500. The processor 502 may include logic that may interpret, execute, and/or otherwise process information contained in, for example, the memory 504. The information may include computer-executable instructions and/or data that may implement one or more embodiments of the invention. The processor 502 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 503. Moreover, the processor 502 may include a system-on-chip (SoC) or system-in-package (SiP).

The electronic device 500 may include one or more tangible non-transitory computer-readable storage media for storing one or more computer-executable instructions or software that may implement one or more embodiments of the invention. The non-transitory computer-readable storage media may be, for example, the memory 504 or the storage 518. The memory 504 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 500 may include a virtual machine (VM) 505 for executing the instructions loaded in the memory 504. A virtual machine 505 may be provided to handle a process running on multiple processors so that the process may appear to be using only one computing resource rather than multiple computing resources. Virtualization may be employed in the electronic device 500 so that infrastructure and resources in the electronic device may be shared dynamically. Multiple VMs 505 may be resident on a single computing device 500.

A hardware accelerator 506, may be implemented in an ASIC, FPGA, or some other device. The hardware accelerator 506 may be used to reduce the general processing time of the electronic device 500.

The electronic device 500 may include a network interface 608 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 608 may include a built-in network adapter, network interface card, personal computer memory card international association (PCMCIA) network card, card bus network adapter, wireless network adapter, universal serial bus (USB) network adapter, modem or any other device suitable for interfacing the electronic device 500 to any type of network capable of communication and performing the operations described herein.

The electronic device 500 may include one or more input devices 510, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 500 may include other suitable I/O peripherals.

The input devices 510 may allow a user to provide input that is registered on a visual display device 514. A graphical user interface (GUI) 516 may be shown on the display device 514.

A storage device 518 may also be associated with the computer 500. The storage device 518 may be accessible to the processor 502 via an I/O bus. The information may be executed, interpreted, manipulated, and/or otherwise processed by the processor 502. The storage device 518 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 518 may further store applications 524, and the electronic device 500 can be running an operating system (OS) 518. Examples of OS 518 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 518 may further store tunneling logic 528 for creating a tunnel between the server and the peering router and/or for encapsulating packets, as described in step 420 of FIG. 4A. The tunneling logic 528 may further include logic for recognizing and decapsulating encapsulated packets, as described in steps 450 and 480 of FIG. 4B. For example, the tunneling logic 528 may include logic for implementing Generic Routing Encapsulation (GRE).

The storage device 518 may further store routing logic 530 for determining to which peering router/egress port to route the packet, as described in steps 420 and 430 of FIG. 4A. Furthermore, the routing logic 530 may include logic for determining where to route the packet when received at a device such as a peering router (e.g., using BGP, as described in step 460 of FIG. 4B) and/or on which egress port of a device a packet should be sent out (as described in step 470 of FIG. 4B). In either case, the routing logic 530 may consult one or more routing tables 532.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. For example, the invention may be practiced without the use of an idle period analyzer 160 or without determining whether the system 110 is in an idle period. Thus, non-latency-sensitive requests may be divided into sub-requests and serviced without regard to whether an idle period is in effect. Alternatively, the idle period analyzer 160 could be used without splitting the non-latency-sensitive requests into sub-requests.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A system comprising:
a computer-readable memory storing instructions;
a processor configured to execute the instructions, wherein the instructions, when executed by the processor, cause the processor to:
receive a network packet having a header specifying a source and a destination for the network packet;
maintain a non-Border Gateway Protocol (non-BGP) routing table distinct from a Border Gateway Protocol (BGP) routing table, the non-BGP routing table including, for each of a plurality of identified routes, identifiers for a corresponding peering router and router egress port;
select a route from the plurality of identified routes included in the non-BGP routing table based on the header of the network packet;
generate an encapsulation packet encapsulating the network packet, the encapsulation packet specifying the peering router and the router egress port corresponding to the selected route; and
transmit the encapsulation packet on the selected route.

2. The system of claim 1, wherein the encapsulation packet further includes a specification of an encapsulation scheme.

3. The system of claim 2, further comprising a network device configured to:
receive the encapsulation packet; and
determine, from the specification in the received encapsulation packet of the encapsulation scheme, that the encapsulation packet is encapsulating the network packet.

4. The system of claim 3, wherein the network device is configured to:
retrieve the network packet from the encapsulation packet; and
forward the network packet through the router egress port specified by the encapsulation packet.

5. The system of claim 3, wherein the network device is configured to override a BGP-selected path with a path specified by the encapsulation packet.

6. The system of claim 1, wherein the encapsulating packet is one of: a Generic Routing Encapsulation (GRE) packet, an IP-IP packet, a Multiprotocol Label Switching (MPLS)-tagged packet, or a Virtual Local Area Network (VLAN) packet.

7. The system of claim 1, wherein the encapsulation packet specifies the router egress port using a Multiprotocol Label Switching (MPLS) label.

8. A method comprising:
receiving, by a first network device comprising a computer processor, a network packet having a header specifying a source and a destination for the network packet;
maintaining a non-Border Gateway Protocol (non-BGP) routing table distinct from a Border Gateway Protocol (BGP) routing table, the non-BGP routing table including, for each of a plurality of identified routes, identifiers for a corresponding peering router and router egress port;
selecting, by the network device, a route from the plurality of identified routes included in the non-BGP routing table based on the header of the network packet;
generating an encapsulation packet encapsulating the network packet, the encapsulation packet specifying the peering router and the router egress port corresponding to the selected route; and
transmitting, by the network device, the encapsulation packet on the selected route.

9. The method of claim 8, wherein the encapsulation packet further includes a specification of an encapsulation scheme.

10. The method of claim 9, further comprising:
receiving the encapsulation packet by a second network device different from the first network device; and
determine, by the second network device, from the specification in the received encapsulation packet of the encapsulation scheme, that the encapsulation packet is encapsulating the network packet.

11. The method of claim 10, further comprising:
retrieving, by the second network device, the network packet from the encapsulation packet; and
forwarding, by the second network device, the network packet through the router egress port specified by the encapsulation packet.

12. The method of claim 10, wherein the second network device is configured to override a BGP-selected path with a path specified by the encapsulation packet.

13. The method of claim 10, comprising overriding, by the second network device, a BGP-selected path for the network packet with a path specified by the encapsulation packet.

14. The method of claim 8, wherein the encapsulating packet is one of: a Generic Routing Encapsulation (GRE) packet, an IP-IP packet, a Multiprotocol Label Switching (MPLS)-tagged packet, or a Virtual Local Area Network (VLAN) packet.

15. The method of claim 8, wherein the encapsulation packet specifies the router egress port using a Multiprotocol Label Switching (MPLS) label.

16. A non-transitory computer-readable medium storing instructions that, when executed by a processor, cause the processor to:

receive a network packet having a header specifying a source and a destination for the network packet;

maintain a non-Border Gateway Protocol (non-BGP) routing table distinct from a Border Gateway Protocol (BGP) routing table, the non-BGP routing table including, for each of a plurality of identified routes, identifiers for a corresponding peering router and router egress port;

select a route from the plurality of identified routes included in the non-BGP routing table based on the header of the network packet;

generate an encapsulation packet encapsulating the network packet, the encapsulation packet specifying the peering router and the router egress port corresponding to the selected route; and transmit the encapsulation packet on the selected route.

17. The computer-readable medium of claim 16, wherein the encapsulation packet further includes a specification of an encapsulation scheme.

18. The computer-readable medium of claim 17, wherein the specification of the encapsulation scheme enables a recipient of the encapsulation packet to determine, from the specification in the received encapsulation packet of the encapsulation scheme, that the encapsulation packet is encapsulating the network packet.

19. The computer-readable medium of claim 16, wherein the encapsulating packet is one of: a Generic Routing Encapsulation (GRE) packet, an IP-IP packet, a Multiprotocol Label Switching (MPLS)-tagged packet, or a Virtual Local Area Network (VLAN) packet.

20. The computer-readable medium of claim 16, wherein the encapsulation packet specifies the router egress port using a Multiprotocol Label Switching (MPLS) label.

* * * * *